(12) United States Patent
Ogasawara et al.

(10) Patent No.: US 9,312,613 B2
(45) Date of Patent: Apr. 12, 2016

(54) TERMINAL FIXATION STRUCTURE AND POWER SUPPLY DEVICE USING THE SAME

(71) Applicant: Yazaki Corporation, Minato-ku, Tokyo (JP)

(72) Inventors: Shigeyuki Ogasawara, Kakegawa (JP); Shinichi Yanagihara, Kakegawa (JP); Michio Ota, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 35 days.

(21) Appl. No.: 14/332,507

(22) Filed: Jul. 16, 2014

(65) Prior Publication Data

US 2014/0329413 A1 Nov. 6, 2014

Related U.S. Application Data

(63) Continuation of application No. PCT/JP2013/000081, filed on Jan. 11, 2013.

(30) Foreign Application Priority Data

Jan. 27, 2012 (JP) .................................. 2012-015306

(51) Int. Cl.
*H01R 24/00* (2011.01)
*H01R 33/00* (2006.01)
*H01R 11/28* (2006.01)
*H01M 2/04* (2006.01)
*H01M 2/10* (2006.01)
(Continued)

(52) U.S. Cl.
CPC ............. *H01R 11/288* (2013.01); *H01M 2/043* (2013.01); *H01M 2/1077* (2013.01); *H01M 2/206* (2013.01); *H01R 9/2416* (2013.01); *H01M 2220/20* (2013.01)

(58) Field of Classification Search
CPC .... H01R 11/288; H01R 11/28; H01R 9/2416; H01R 9/24; H01M 2/043; H01M 2/1077; H01M 2/206; H01M 2220/20
USPC .......................................... 439/627, 709, 500
See application file for complete search history.

(56) References Cited

U.S. PATENT DOCUMENTS 8,304,655 B2 * 11/2012 Ikeda et al. ................ 174/133 B
8,449,333 B2 * 5/2013 Ikeda et al. .................... 439/627
(Continued)

FOREIGN PATENT DOCUMENTS

JP 2006-185668 A 7/2006
JP 2010-267586 A 11/2010
(Continued)

OTHER PUBLICATIONS

International Search Report of PCT/JP2013/000081 dated May 31, 2013.
Written Opinion of the International Searching Authority of PCT/JP2013/000081 dated May 31, 2013.
(Continued)

*Primary Examiner* — Javaid Nasri
(74) *Attorney, Agent, or Firm* — Sughrue Mion, PLLC

(57) ABSTRACT

A terminal fixation structure includes a terminal fixing portion including a terminal housing chamber, a terminal including a positioning recessed portion and housed in the terminal housing chamber, and a positioning rib provided in a center of the terminal fixing portion to protrude into the terminal housing chamber and fitted into the positioning recessed portion.

3 Claims, 9 Drawing Sheets

(51) Int. Cl.
*H01M 2/20* (2006.01)
*H01R 9/24* (2006.01)

(56) References Cited

U.S. PATENT DOCUMENTS

2010/0288532 A1  11/2010  Ikeda et al.
2012/0231640 A1   9/2012  Ikeda et al.

FOREIGN PATENT DOCUMENTS

JP   2012-199007 A   10/2012
WO   2011/043261 A1   4/2011

OTHER PUBLICATIONS

Communication dated Dec. 1, 2015, from the Japanese Patent Office in counterpart application No. 2012-015306.

* cited by examiner

FIG. 4
PRIOR ART
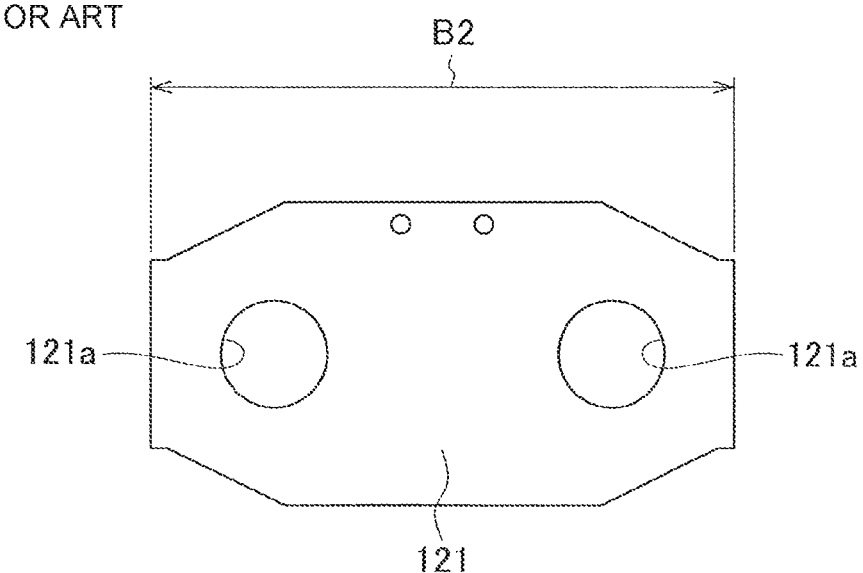
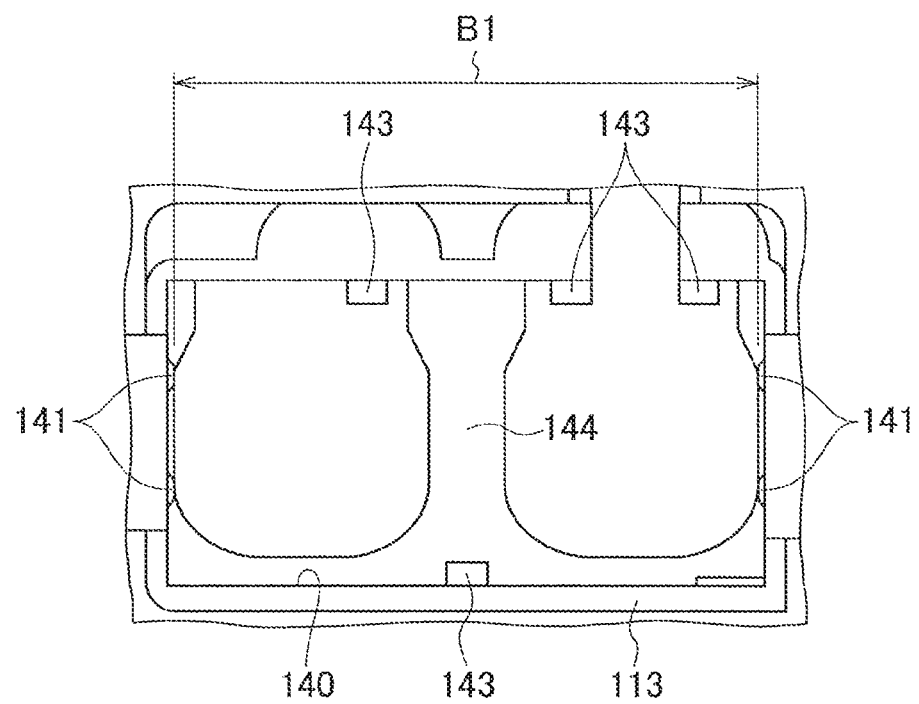

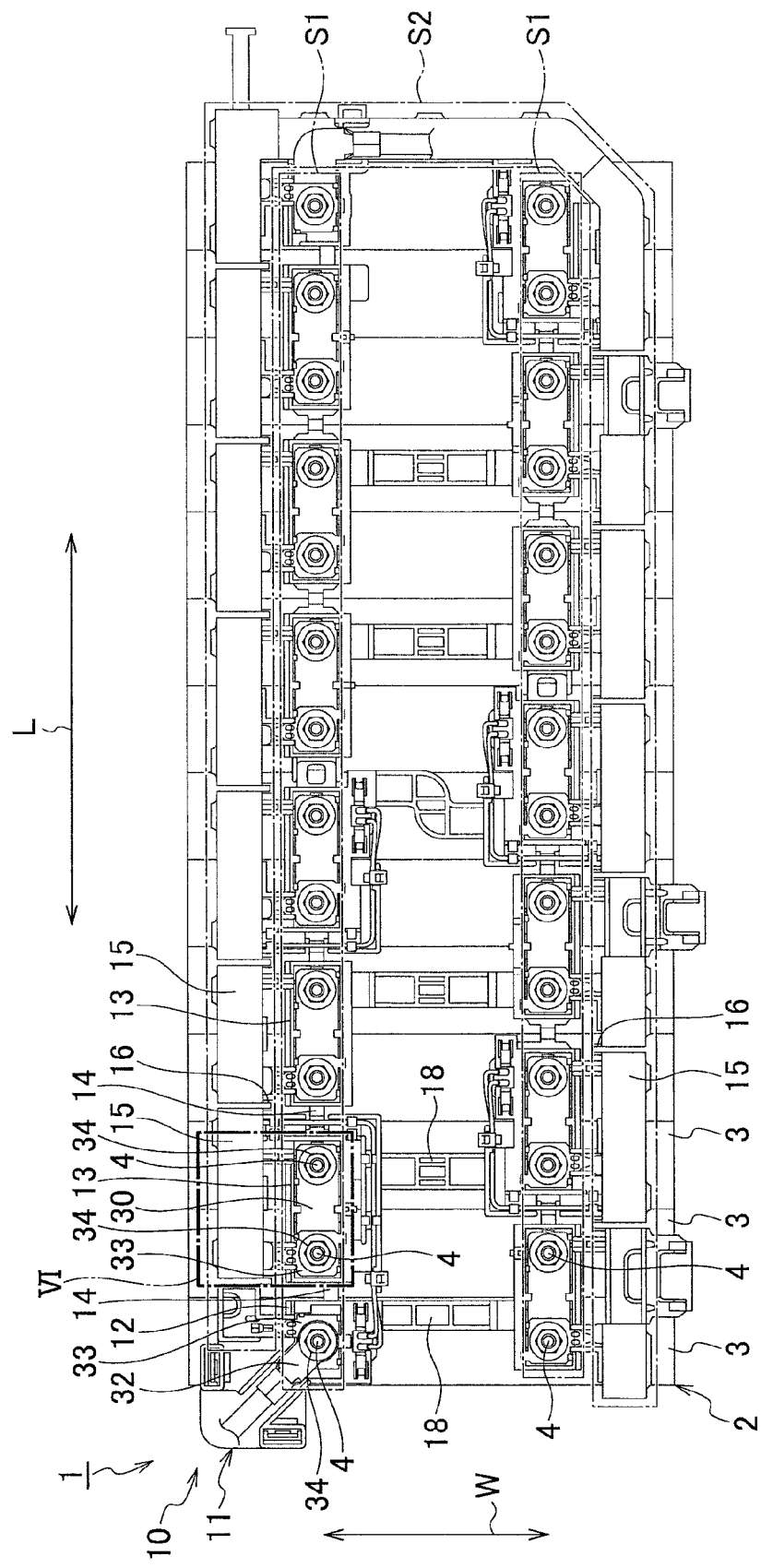

TERMINAL FIXATION STRUCTURE AND POWER SUPPLY DEVICE USING THE SAME

CROSS REFERENCE TO RELATED APPLICATION

This application is a Continuation of PCT Application No. PCT/JP2013/000081, filed on Jan. 11, 2013, and claims the priority of Japanese Patent Application No. 2012-015306, filed on Jan. 27, 2012, the content of both of which is incorporated herein by reference.

BACKGROUND

1. Technical Field

The present invention relates to a terminal fixation structure for fixing a terminal to a terminal fixing portion, and to a power supply device using the same.

2. Related Art

A power supply device serving as a drive source of an electric motor is mounted on a hybrid vehicle or an electric vehicle, for example. In the power supply device of this type, electrodes of multiple battery cells are connected to one another by using connection terminals fixed to terminal connecting portions (see Japanese Unexamined Patent Application Publication No. 2010-267586). A power supply device employing an example of such a related terminal fixation structure is illustrated in FIG. 1.

In FIG. 1, a power supply device 100 includes a battery cell assembly 101, and a battery connecting block 110 located on a side of the battery cell assembly 101 where electrodes protrude.

Multiple battery cells 102 are stacked in the same direction in the battery cell assembly 101. Each battery cell 102 includes a pair of electrodes (a positive electrode and a negative electrode) 103 protruding on an upper surface thereof. Each electrode 103 has a shape of a bolt.

The battery connecting block 110 includes a case body 111 made of an insulating resin, multiple connection terminals 121, a pair of output terminals 120, and multiple voltage detecting terminals 123 which are fixed to the case body 111.

The case body 111 includes a pair of terminal fixing areas S1 arranged in a longitudinal direction L on two end sides in a width direction W, and a wiring area S2 located outside the pair of terminal fixing areas S1 in such a manner as to surround the entire periphery of the pair of terminal fixing areas S1.

Multiple terminal fixing portions 112 and 113 are arranged in a row in each terminal fixing area S1. Every two adjacent terminal fixing portions 112 and 113 are connected to each other via a hinge portion 114. The pair of terminal fixing portions 112 placed on two opposite ends in one of the rows are provided for total power output. Each set of the output terminal 120 and voltage detecting terminal 123 is fixed to the corresponding terminal fixing portion 112 for total power output. The output terminal 120 and the voltage detecting terminal 123 are fastened to a corresponding one of the electrodes 103 located on two ends of the battery cell assembly 101 by using a nut 124. Each set of the connection terminal 121 and voltage detecting terminal 123 is fixed to the corresponding terminal fixing portion 113. The connection terminal 121 is fastened to the electrodes 103 of the adjacent battery cells 102 by using nuts 124, respectively. The voltage detecting terminal 123 is fastened together with the connection terminal 121.

Multiple wire housing portions 115 are continuously arranged in the wiring area S2. Every two adjacent wire housing portions 115 are connected to each other via a hinge portion 116. A voltage detecting wire (not shown) connected to each voltage detecting terminal 123 is routed in the corresponding wire housing portion 115.

Next, a fixation structure of each connection terminal 121 will be described in detail. As shown in FIGS. 2 to 4, each terminal fixing portion 113 includes a terminal housing chamber 140 having a slightly larger dimension than a dimension of the connection terminal 121. A pair of positioning ribs 141 are provided at each of two end portions in a longitudinal direction M of the terminal fixing portion 113 in such a manner as to protrude into the terminal housing chamber 140. Multiple upper regulating ribs 143 are provided at two end portions in a direction N perpendicular to the longitudinal direction M of the terminal fixing portion 113 in such a manner as to protrude into the terminal housing chamber 140. A terminal placement plate portion 144 is provided on a bottom surface of the terminal housing chamber 140. The terminal placement plate portion 144 is provided across regions of the terminal housing chamber 140, namely, a central region, right and left end regions in the longitudinal direction, and regions connecting the central region to the end regions.

The connection terminal 121 includes a pair of electrode insertion holes 121a. The connection terminal 121 is inserted from above into the terminal housing chamber 140. The inserted connection terminal 121 crosses over the multiple upper regulating ribs 143 and is placed on the terminal placement plate portion 144. Meanwhile, two end surfaces in the longitudinal direction M of the connection terminal 121 are brought into contact with the pairs of positioning ribs 141. In this way, the connection terminal 121 is positioned with respect to the terminal fixing portion 113 in the longitudinal direction M.

SUMMARY

However, according to the related terminal fixation structure, as shown in FIG. 4, the pairs of positioning ribs 141 are provided on two ends in the longitudinal direction M of the terminal housing chamber 140 and an interval B1 between the pairs of positioning ribs 140 is set as a fit dimension on the terminal fixing portion 113 side. In response, a dimension B2 in the longitudinal direction M of the connection terminal 121 is set as a fit dimension on the connection terminal 121 side. For this reason, the fit dimensions of both of the components are large and their dimensional tolerances are therefore large. Thus, the connection terminal 121 might fail to be positioned precisely with respect to the terminal fixing portion 113 in the longitudinal direction M.

An object of the present invention is to provide a terminal fixation structure capable of precisely positioning a terminal with respect to a terminal fixing portion, and to provide a power supply device using the structure.

A terminal fixation structure in accordance with some embodiments includes a terminal fixing portion including a terminal housing chamber, a terminal including a positioning recessed portion and housed in the terminal housing chamber, and a positioning rib provided in a center of the terminal fixing portion to protrude into the terminal housing chamber and fitted into the positioning recessed portion.

The positioning rib may extend from a terminal insertion starting position to a terminal insertion ending position of the terminal housing chamber.

A power supply device in accordance with some embodiments includes a battery cell assembly being an assembly of battery cells each having electrodes, a battery connecting block placed on a side of the battery cell assembly where the electrodes are located, the battery connecting block including a case body provided with terminal fixing portions each having a terminal housing chamber, terminals each having a positioning recessed portion and housed in the corresponding terminal housing chamber, and positioning ribs each provided in a center of the corresponding terminal fixing portion to protrude into the corresponding terminal housing chamber and fitted into the corresponding positioning recessed portion.

According to the above-described configurations, a width dimension of the positioning rib of the terminal fixing portion is set as a fit dimension on the terminal fixing portion side, and a width of the positioning recessed portion of the connection terminal is set as a fit dimension on the connection terminal portion side. For this reason, the fit dimensions of both of the components are small and their dimensional tolerances are therefore small. Thus, the terminal can be precisely positioned with respect to the terminal fixing portion.

BRIEF DESCRIPTION OF DRAWINGS

FIG. 4 is a view showing a related example, which is a plan view of both a connection terminal and the terminal fixing portion for describing fit dimensions.

FIG. 5 is an overall plan view of a power supply device according to an embodiment of the present invention.

DETAILED DESCRIPTION

An embodiment of the present invention will be described below with reference to the drawings.

Figure 1:
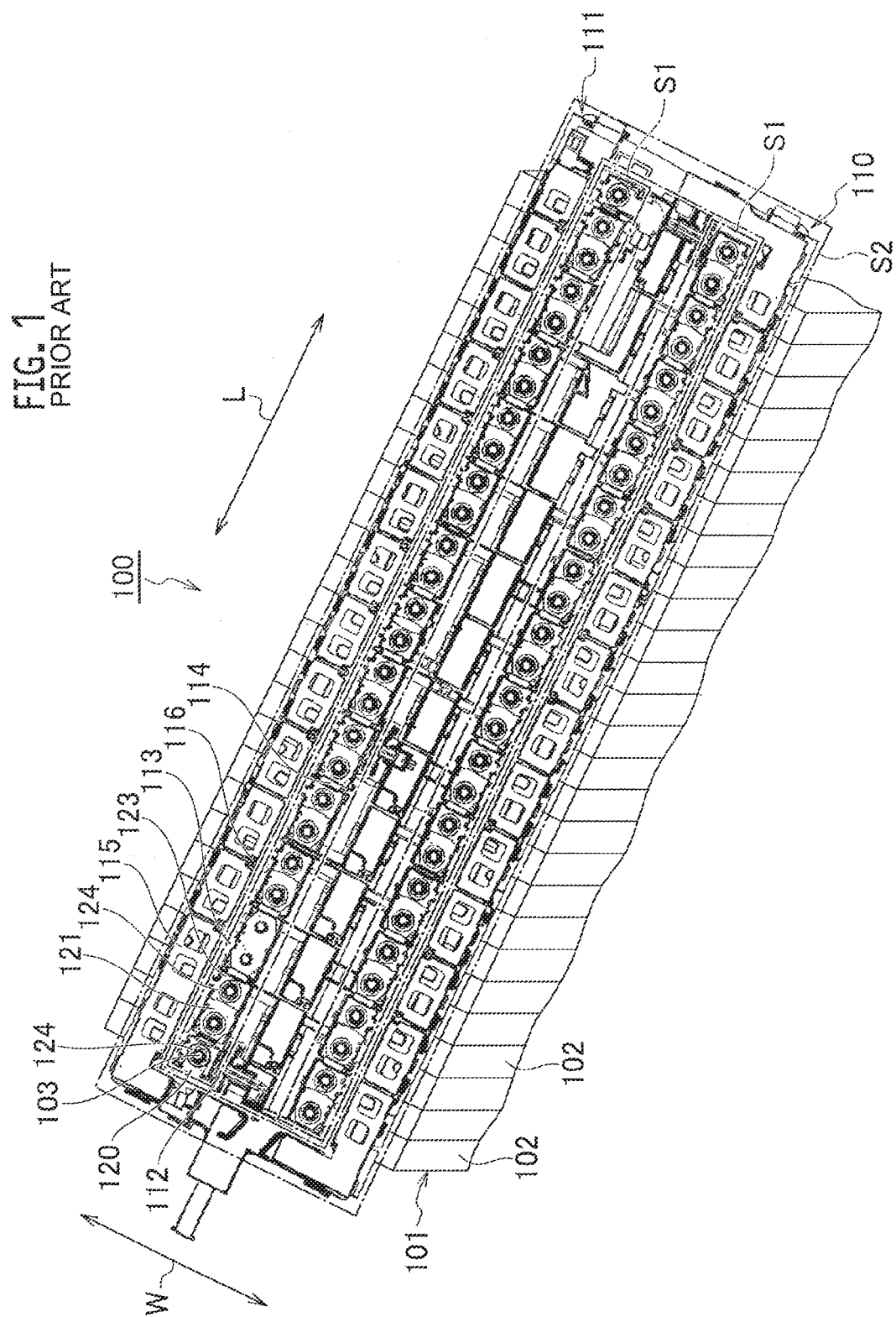
FIG. 1 is an overall perspective view of a related power supply device.
Figure 2:
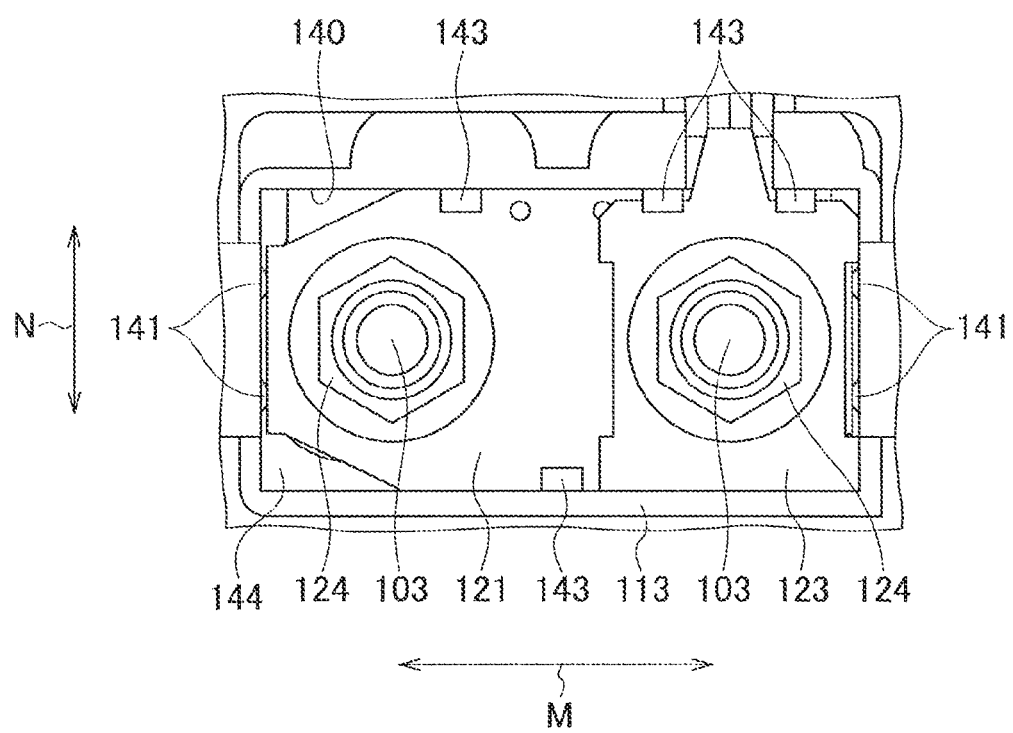
FIG. 2 is a plan view of a related terminal fixation structure.
Figure 3A:
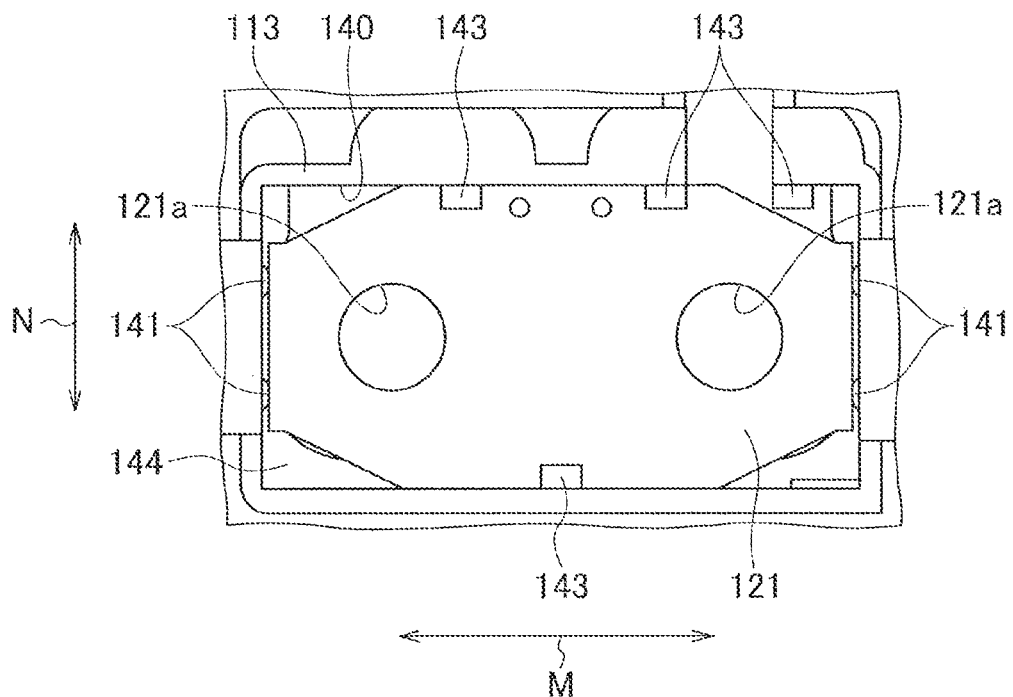
FIG. 3A is a plan view of a related terminal fixing portion.
Figure 3B:
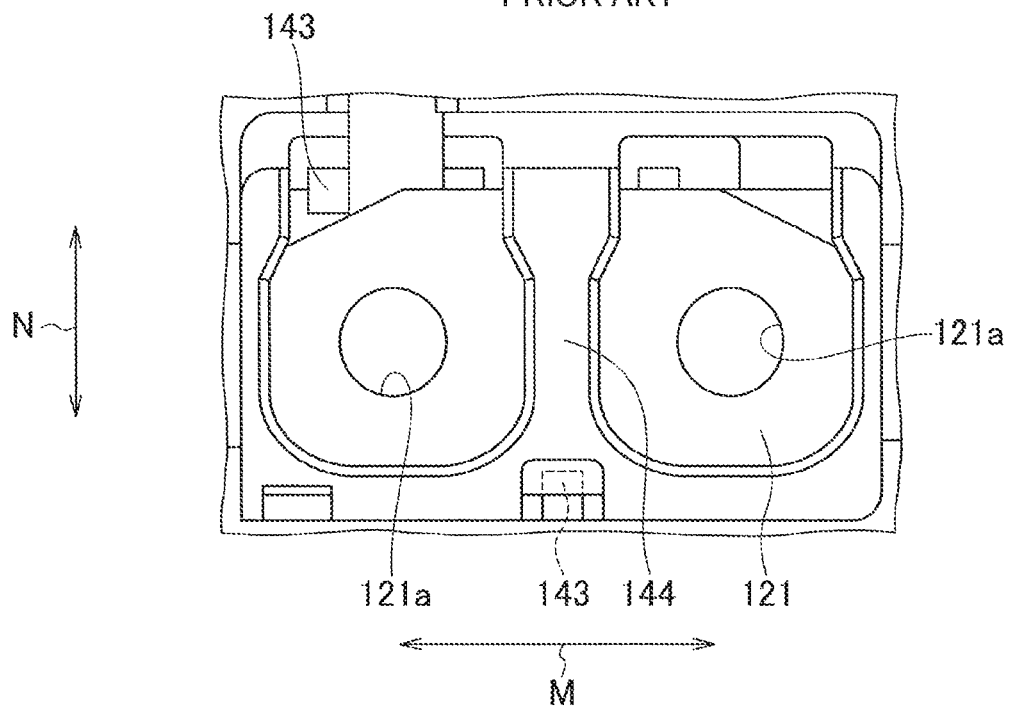
FIG. 3B is a bottom view of the related terminal fixing portion.
Figure 6A:
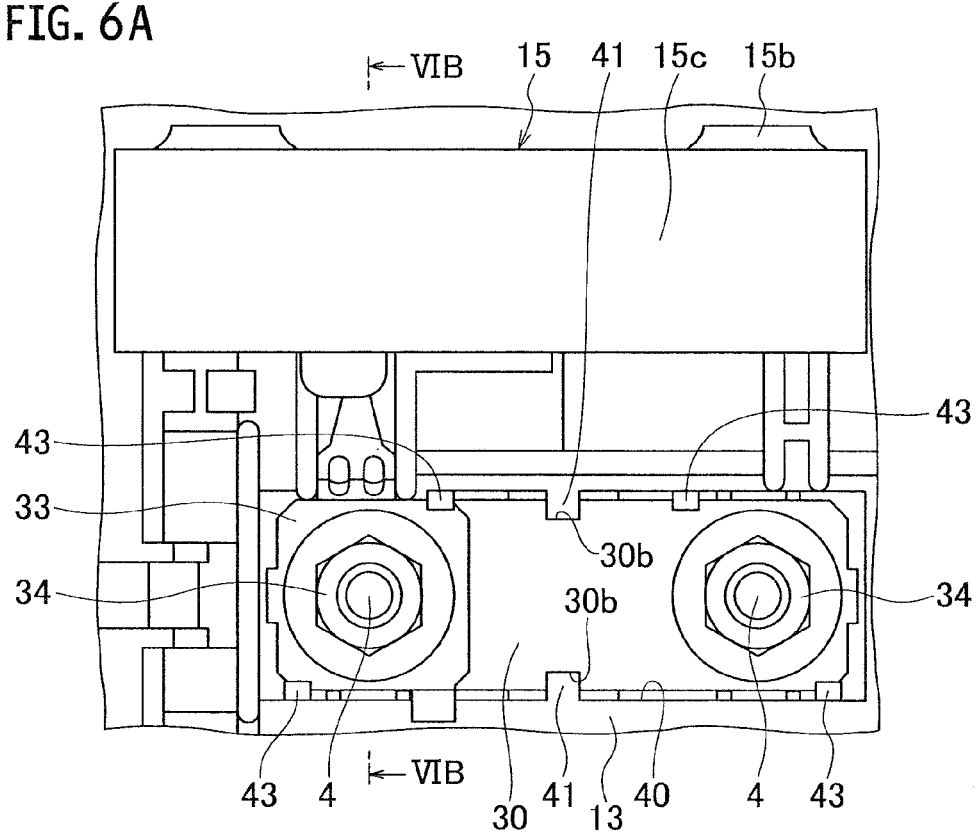
FIG. 6A is an enlarged view of part VI in FIG. 5.
Figure 6B:
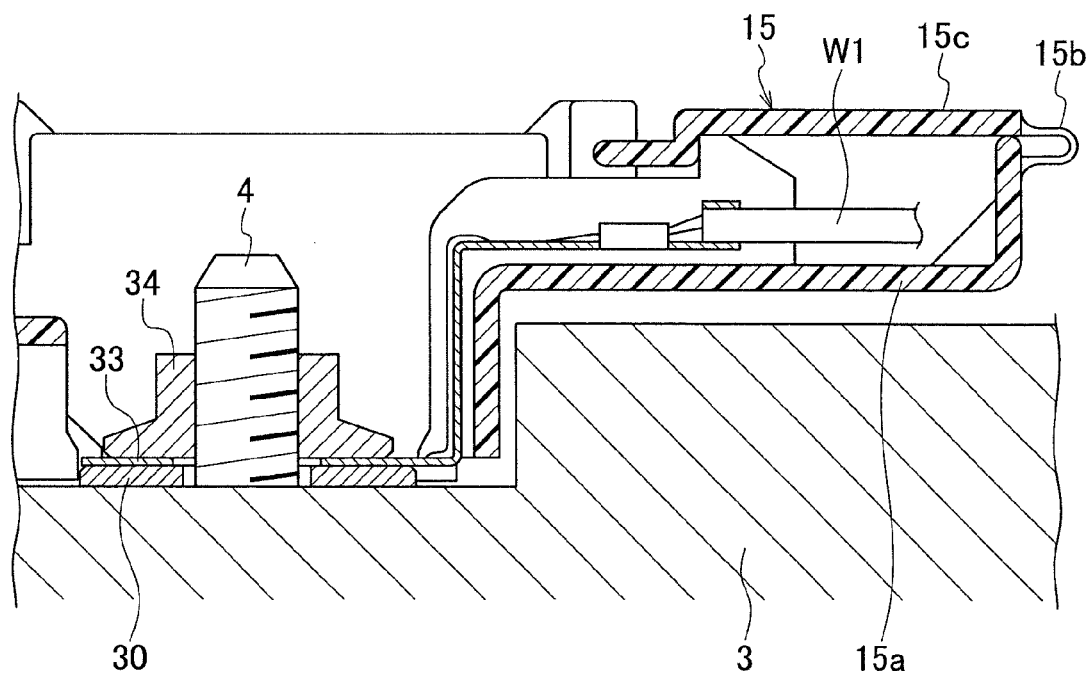
FIG. 6B is a cross-sectional view taken along the VIB-VIB line in FIG. 6A.
Figure 7A:
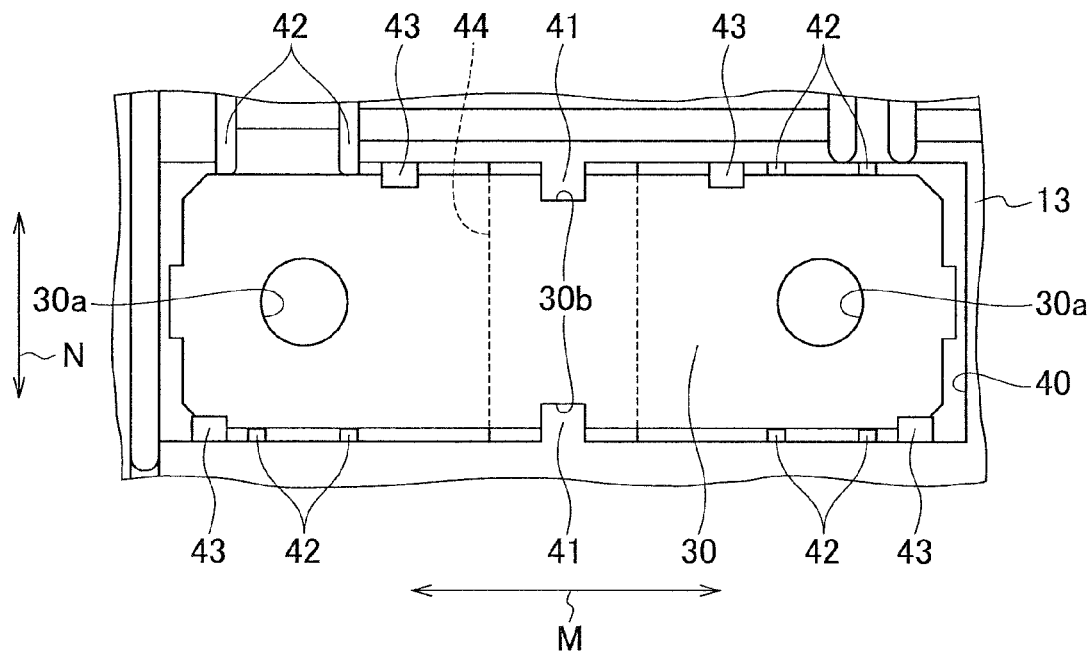
FIG. 7A is a plan view of a terminal fixation structure according to the embodiment of the present invention.
Figure 7B:
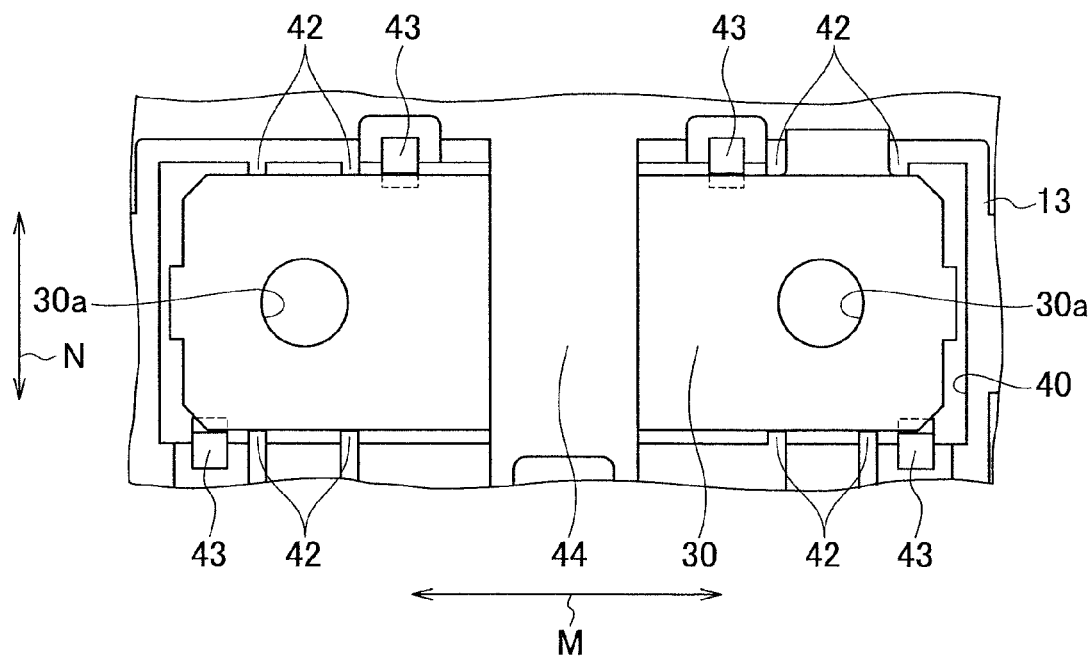
FIG. 7B is a bottom view of the terminal fixation structure according to the embodiment of the present invention.
Figure 8:
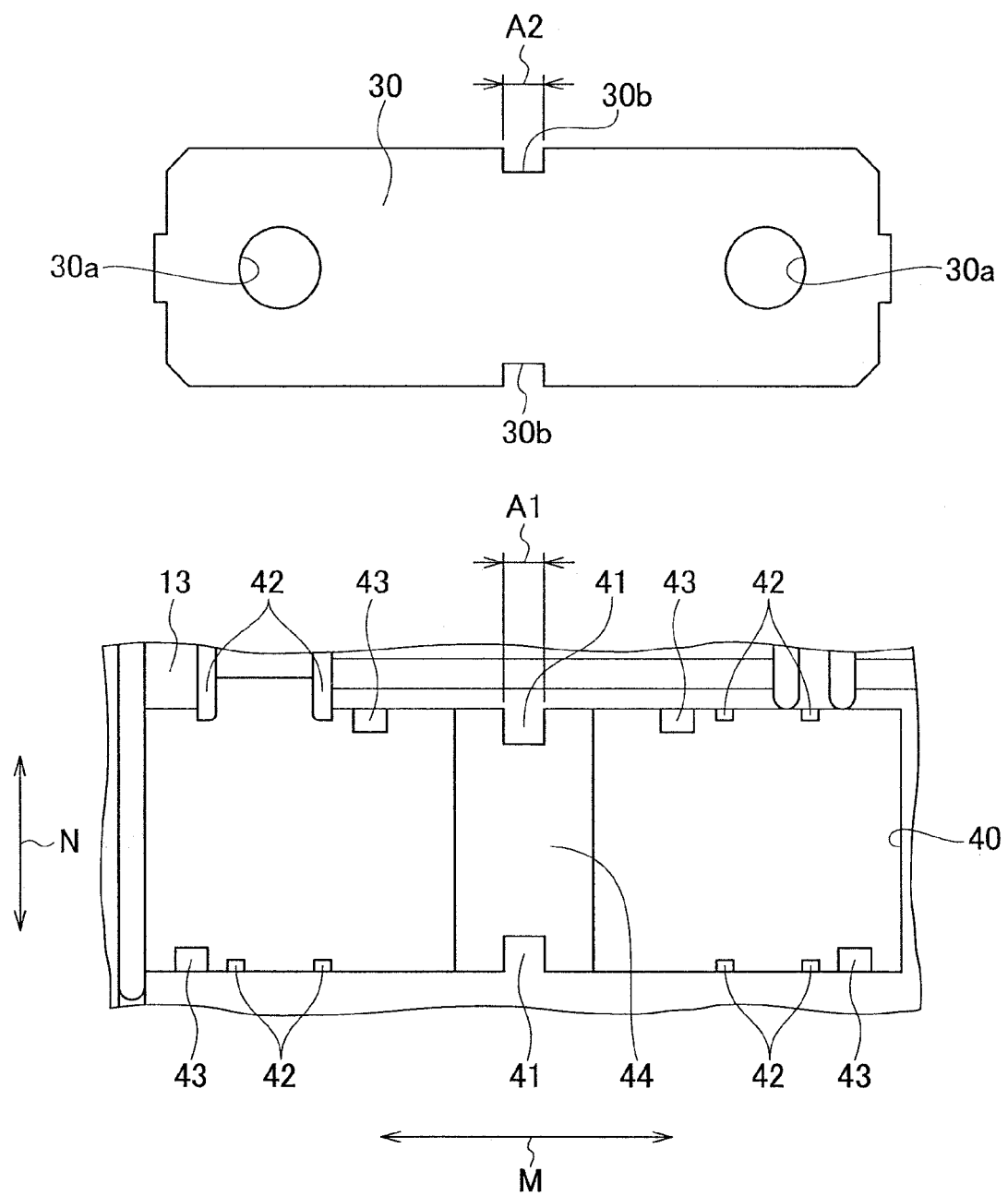
FIG. 8 is a view showing the embodiment of the present invention, which is a plan view of both a connection terminal and a terminal fixing portion for describing fit dimensions.
Figure 9:
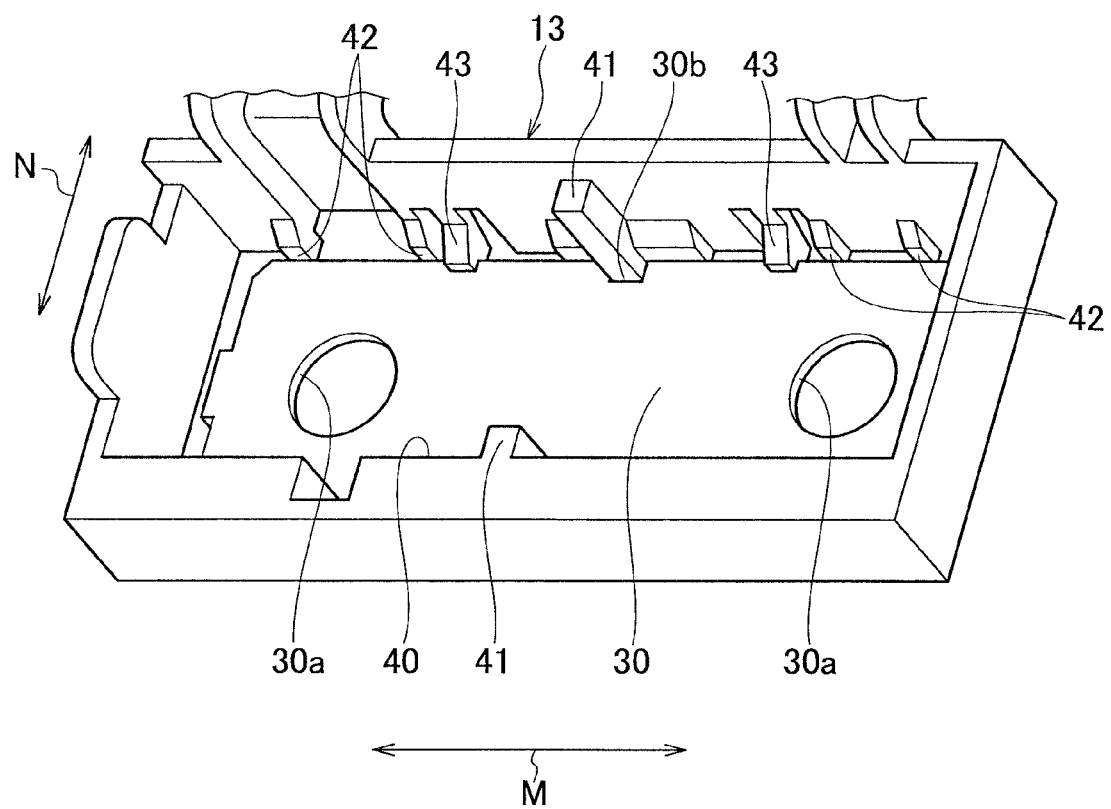
FIG. 9 is a perspective view of the terminal fixing portion according to the embodiment of the present invention.

FIG. 5 to FIG. 9 show an embodiment of the present invention. As shown in FIG. 5, FIG. 6A, and 6B, a power supply device 1 includes a battery cell assembly 2 and a battery connecting block 10 located on a side of the battery cell assembly 2 where electrodes protrude.

The battery cell assembly 2 is an assembly of multiple battery cells 3, in which the multiple battery cells 3 are stacked in the same direction. Each battery cell 3 includes a pair of electrodes (a positive electrode and a negative electrode) 4 protruding on an upper surface thereof. Each electrode 4 has a shape of a bolt.

The battery connecting block 10 includes a case body 11 made of an insulating resin, multiple connection terminals 30 being terminals to be fixed to the case body 11, a pair of output terminals 32 to be similarly fixed to the case body 11, and multiple voltage detecting terminals 33 to be similarly fixed to the case body 11.

The case body 11 includes a pair of terminal fixing areas S1 arranged in a longitudinal direction on two end sides in a width direction W, and a wiring area S2 located outside the pair of terminal fixing areas S1 and arranged in the form of a "U" shape.

Multiple terminal fixing portions 12 and 13 are arranged in a row in each terminal fixing area S1. Every two adjacent terminal fixing portions 12 and 13 are connected to each other via a hinge portion 14. The pair of terminal fixing portions 12 placed on two opposite ends in one of the rows are provided for total power output. Each set of the output terminal 32 and voltage detecting terminal 33 is fixed to the corresponding terminal fixing portion 12 for total power output. The output terminal 32 and the voltage detecting terminal 33 are fastened to a corresponding one of the electrodes 4 located on two ends of the battery cell assembly 2 by using a nut 34. Each set of the connection terminal 30 serving as a terminal and voltage detecting terminal 33 is fixed to the corresponding terminal fixing portion 13. One end of each connection terminal 30 is fastened to the electrode 4 of one of the corresponding adjacent battery cells 3 by using a nut 34. The other end of the connection terminal 30 and the corresponding voltage detecting terminal 33 are fastened to the electrode 4 of the other adjacent battery cell 3 by using a nut 34. The electrodes 4 between the adjacent battery cells 3 are connected by the connection terminals 30. A fixation structure of each connection terminal 30 will be described below in detail.

Each hinge portion 14 can change a gap between the corresponding two adjacent terminal fixing portions 12 and 13 by flexural deformation. The terminal fixing portions 12 and of the respective two rows arranged at substantially corresponding positions are connected to one another via connecting arm portions 18 with some exceptions.

Multiple wire housing portions 15 are arranged in a row in the wiring area S2. Every two adjacent wire housing portions 15 are connected to each other via a hinge portion 16. As shown in detail in FIGS. 6A and 6B, each wire housing portion 15 includes a housing base portion 15a, and a lid 15c connected to the housing base portion 15a via a hinge 15b. A voltage detecting wire W1 connected to each voltage detecting terminal 33 is guided to the nearest wire housing portion 15 and is routed by using other wire housing portions 15 continuous from the nearest wire housing portion 15.

Next, a terminal fixation structure of each connection terminal 30 will be described. As shown in FIG. 7A to FIG. 9, each terminal fixing portion 13 includes a terminal housing chamber 40 which is larger than a dimension in a longitudinal direction M of the connection terminal 30. A pair of positioning ribs 41 are provided in the center of two side portions in the longitudinal direction M of the terminal fixing portion 13 in such a manner as to protrude into the terminal housing chamber 40. Each positioning rib 41 is provided from a terminal insertion starting position to a terminal insertion ending position of the terminal housing chamber 40 (see FIG. 9). In other words, each positioning rib 41 extends from a bottom surface to the vicinity of an opening of the terminal housing chamber 40.

Multiple stopper ribs 42 and multiple upper regulating ribs 43 are provided on the two side portions in the longitudinal direction M of the terminal fixing portion 13 in such a manner as to protrude into the terminal housing chamber 40. A terminal placement plate portion 44 is provided on a bottom surface of the terminal housing chamber 40. The terminal placement plate portion 44 is provided only in a central region of the terminal housing chamber 40. In other words, the terminal placement plate portion 44 is provided only in a peripheral region of the pair of positioning ribs 41.

The connection terminal 30 includes a pair of electrode insertion holes 30a. A pair of positioning recessed portions 30b for allowing insertion of the positioning ribs 41 are provided in the center of the two side portions in the longitudinal direction M of the connection terminal 30. The connection terminal 30 is inserted from above into the terminal housing chamber 40. The inserted connection terminal 30 crosses over the multiple upper regulating ribs 43 and is placed on the terminal placement plate portion 44. In this way, the connection terminal 30 is positioned with respect to the terminal fixing portion 13 in a vertical direction. The stopper ribs 42 are respectively brought into contact with the two side surfaces in the longitudinal direction M of the connection terminal 30. In this way, the connection terminal 30 is positioned with respect to the terminal fixing portion 13 in a direction N perpendicular to the longitudinal direction M and a direction of horizontal rotation. Meanwhile, the pair of positioning ribs 41 of the terminal fixing portion 13 are fitted into the pair of positioning recessed portions 30b of the connection terminal 30. In this way, the connection terminal 30 is positioned with respect to the terminal fixing portion 13 in the longitudinal direction M.

In the above-described configuration, even when the dimension in the longitudinal direction L of the battery cell assembly 2 varies due to a tolerance in assembling the battery cells 3 and the like, the hinge portions 14 between the terminal fixing portions 12 and 13 and the hinge portions 16 between the wire housing portions 15 absorb such a dimensional variation by means of flexural deformation.

In addition, the positioning ribs 41 protruding towards the terminal housing chamber 40 are provided in the center of the terminal fixing portion 13, and the positioning recessed portions 30b for allowing insertion of the positioning ribs 41 are provided in the connection terminal 30. Accordingly, a width dimension A1 (shown in FIG. 8) of each positioning rib 41 of the terminal fixing portion 13 is set as a fit dimension on the terminal fixing portion 13 side and a width dimension A2 (shown in FIG. 8) of each positioning recessed portion 30b of the connection terminal 30 is set as a fit dimension on the connection terminal 30 side. For this reason, the fit dimensions of both of the components are small and their dimensional tolerances are therefore small. Thus, the connection terminal 30 can be precisely positioned with respect to the terminal fixing portion 13.

Moreover, since the positioning ribs 41 are provided in the center of the terminal fixing portion 13, the connection terminal 30 can reliably be inserted into a predetermined position just by providing the terminal placement plate portion 44 in the central region of the terminal housing chamber 40 as in the embodiment described above. For this reason, it is possible to reduce an installation area of the terminal placement plate portion 44 as compared to a conventional example and thereby to reduce resin usage.

Each positioning rib 41 is provided from the terminal insertion starting position to the terminal insertion ending position of the terminal housing chamber 40. Accordingly, when the connection terminal 30 is inserted into the terminal housing chamber 40, the positioning ribs 41 function as an insertion guide for the connection terminal 30. As a consequence, the connection terminal 30 can be inserted smoothly and easily into the predetermined position.

What is claimed is:

1. A terminal fixation structure comprising:
    a terminal fixing portion including a terminal housing chamber;
    a terminal including two positioning recesses respectively provided in centers of two sides of the terminal in a longitudinal direction of the terminal and housed in the terminal housing chamber; and
    two positioning ribs respectively provided in centers of two sides of the terminal fixing portion in a longitudinal direction of the terminal fixing portion to protrude into the terminal housing chamber and respectively fitted into the two positioning recesses.

2. The terminal fixation structure according to claim 1, wherein the two positioning ribs extend from a terminal insertion starting position to a terminal insertion ending position of the terminal housing chamber.

3. A power supply device comprising:
    a battery cell assembly being an assembly of battery cells each having electrodes;
    a battery connecting block placed on a side of the battery cell assembly where the electrodes are located, the battery connecting block comprising a case body provided with terminal fixing portions each having a terminal housing chamber, terminals each having two positioning recesses respectively provided in centers of two sides of the terminal in a longitudinal direction of the terminal and housed in the corresponding terminal housing chamber, and positioning ribs respectively provided in centers of two sides of the corresponding terminal fixing portion in a longitudinal direction of the corresponding terminal fixing portion to protrude into the corresponding terminal housing chamber and respectively fitted into the corresponding two positioning recesses.

* * * * *